June 30, 1964   R. D. BRUNSON   3,138,957
DIFFERENTIAL SIGNAL DETECTING APPARATUS
Filed Nov. 9, 1960   4 Sheets-Sheet 1

INVENTOR
RAYMOND D. BRUNSON

BY Cushman, Darby & Cushman
ATTORNEYS

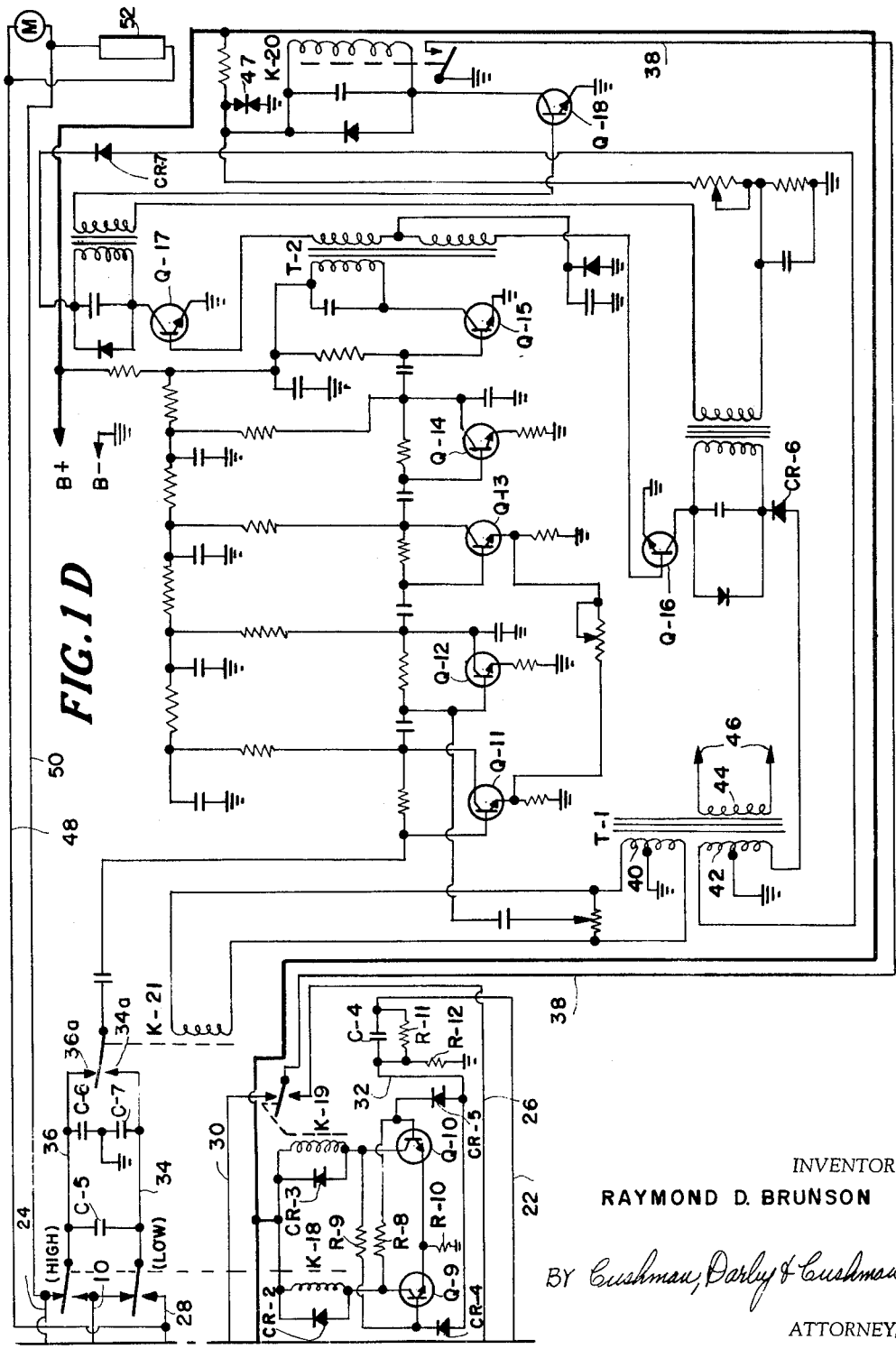

June 30, 1964  R. D. BRUNSON  3,138,957
DIFFERENTIAL SIGNAL DETECTING APPARATUS
Filed Nov. 9, 1960  4 Sheets-Sheet 4

INVENTOR
RAYMOND D. BRUNSON

BY Cushman, Darby & Cushman
ATTORNEYS

United States Patent Office 3,138,957
Patented June 30, 1964

3,138,957
DIFFERENTIAL SIGNAL DETECTING
APPARATUS
Raymond D. Brunson, Fort Worth, Tex., assignor to Howell Instruments, Inc., Fort Worth, Tex., a corporation of Texas
Filed Nov. 9, 1960, Ser. No. 68,265
10 Claims. (Cl. 73—341)

This invention pertains to differential signal detecting apparatus particularly useful in, although not limited to, determining the temperature differential or spread among a plurality of thermocouples in the tail cone of a gas turbine engine. The said differential is determined irrespective of the absolute value of any one or more of the signals. Since such evaluation of engine thermocouples is a particularly interesting field of use, the illustrative embodiment described hereinbelow is of such a system.

Many other uses will occur to those reading this disclosure. For example, in chemical processing plants many heat detecting means are used, and relative temperatures indicated thereby may be ascertained by use of the invention. No restrictions to the use of the present apparatus in temperature sensing is intended because the signals to be analyzed may be from any type of source.

Accordingly, it is a primary object of this invention to provide an apparatus or system which will detect differentials between a plurality of signals and do so irrespective of the absolute values of any of them.

It is a further object of the invention to provide an apparatus system which will seek and hold on the highest and lowest value signals of a plurality thereof.

Further objects and the entire scope of the invention will become apparent from the following detailed description of an illustrative embodiment of the invention and from the appended claims.

The illustrative embodiment may best be understood with reference to the accompanying drawings, wherein.

The circuitry of the illustrative embodiment may be for convenience analyzed as composed of six sections, the thermocouples, the sampling circuit, the memory circuit, the high-low selector circuit, the amplifier circuit, and the indicator circuit. All of these circuits are shown on the accompanying drawings, made up of four sheets. These sheets being parts of FIGURE 1, and designated FIGURES 1A–1D inclusive, should be arranged in accordance with the plan shown in FIGURE 2.

Figure 1A:
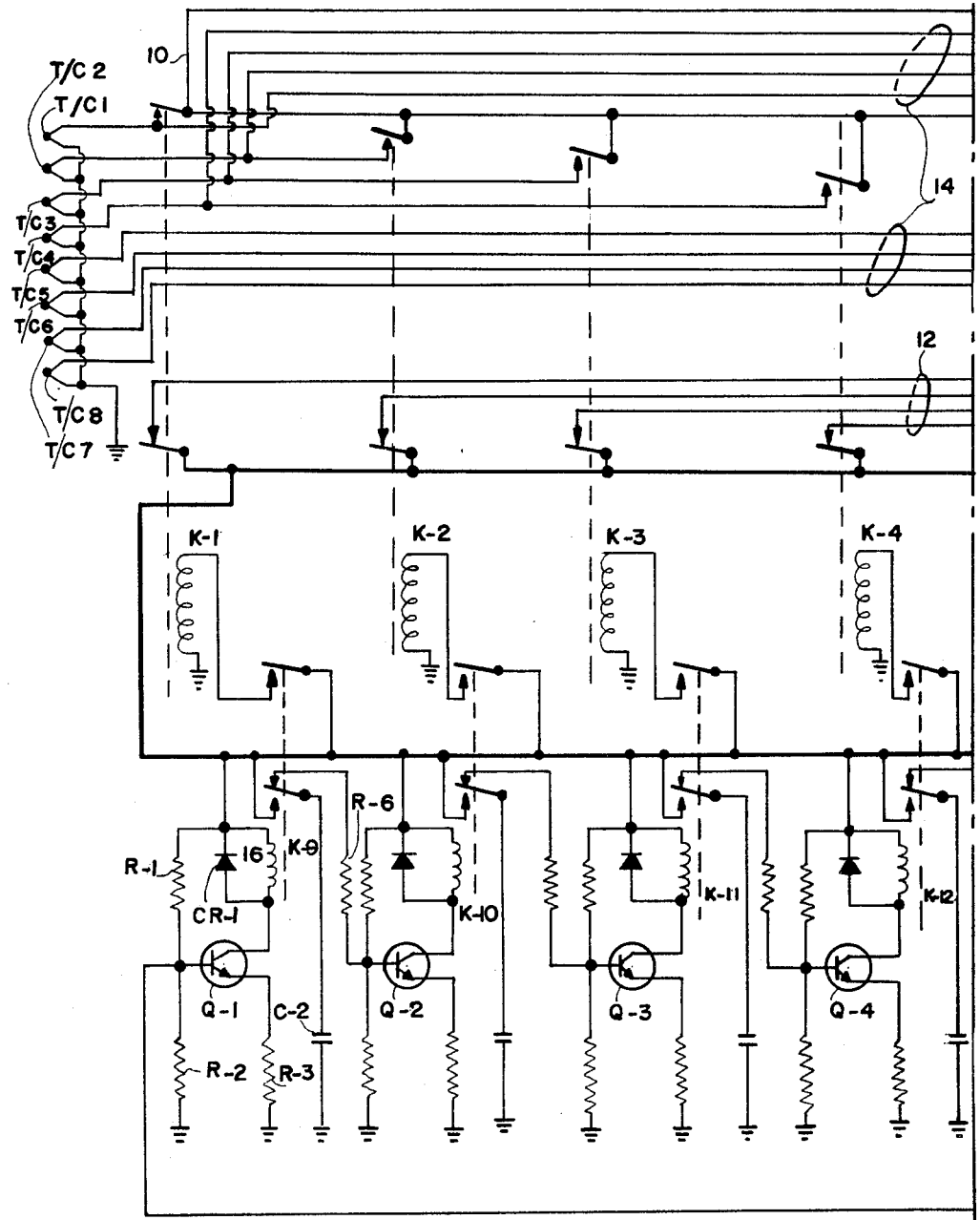
FIGURE 1 is a schematic diagram of a temperature analyzing system.
Figure 1B:
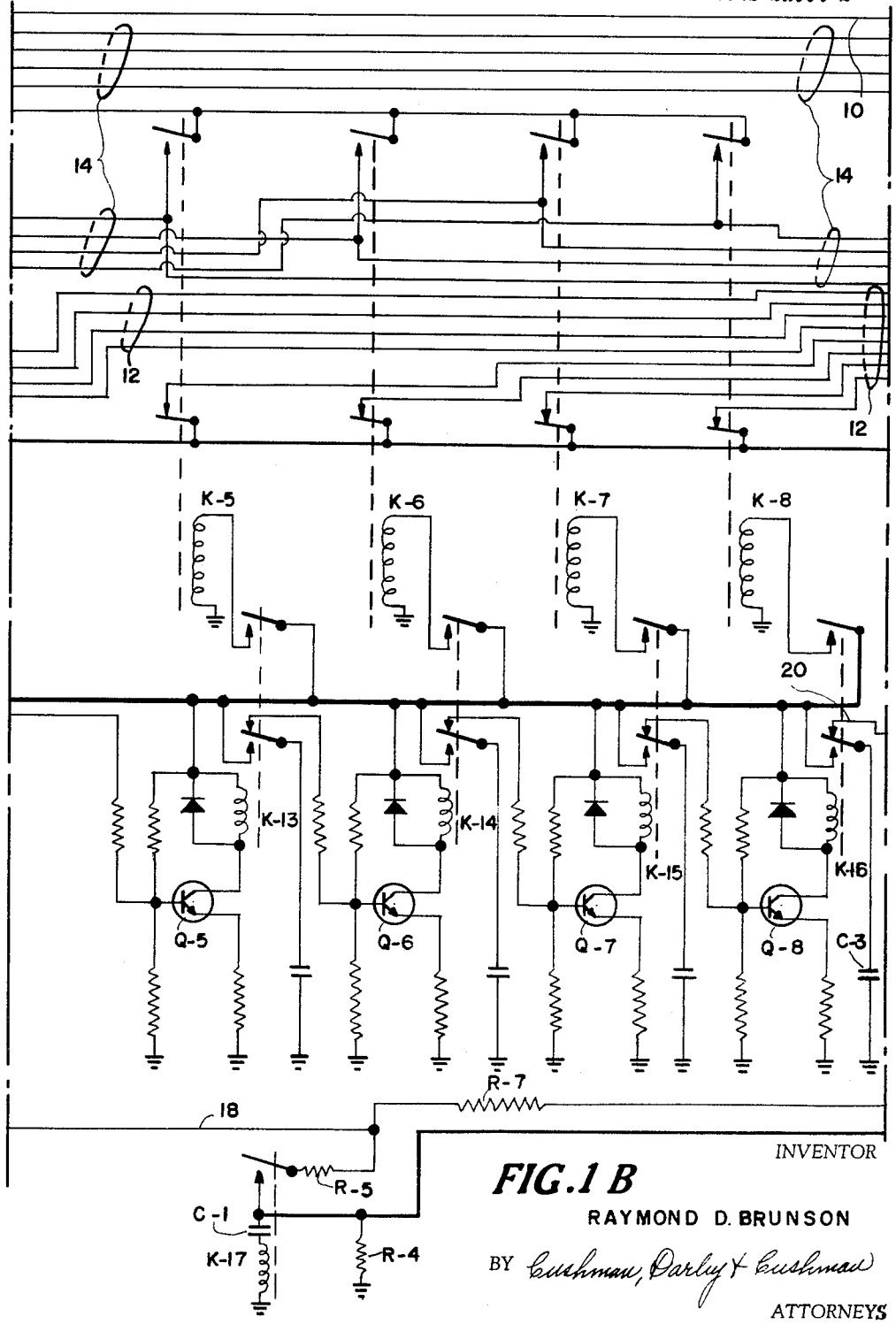
Figure 1C:
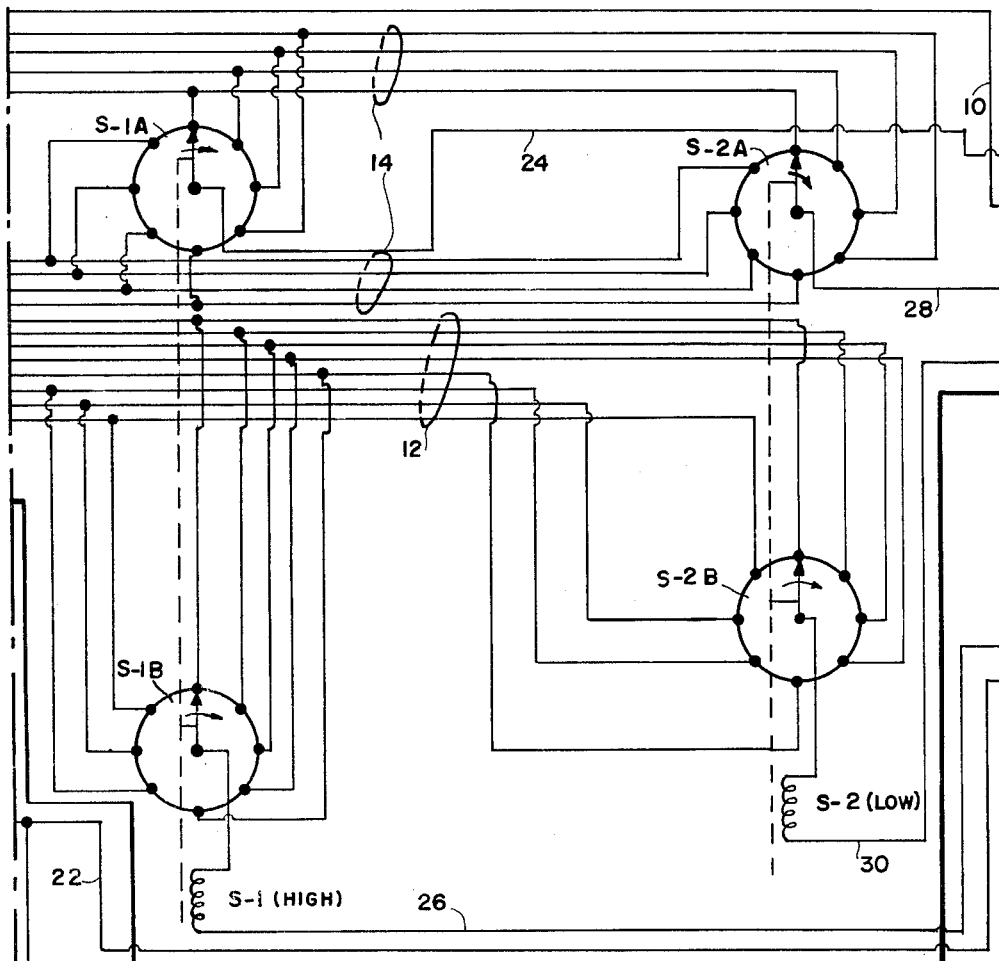
Figure 2:
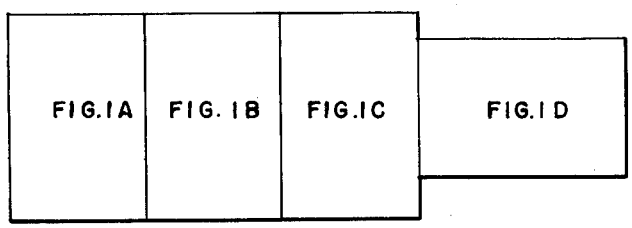
FIGURE 2 is a block diagram showing the arrangement of the drawings to form FIGURE 1, the latter appearing on four sheets individually designated FIGURES 1A–1D.

In FIGURE 1 (as made up of FIGURES 1A–1D) it is to be understood that all ground symbols are to be taken as interconnected, and to be connected to B—. To facilitate circuit analysis, conductors carrying B+ are shown in heavy line up to the first point whereat same meet an impedance or circuit breaking means. All relay contacts are shown in the position occupied when the operating coil of the relay is not energized.

The Thermocouple Circuit

This illustrative embodiment proceeds upon the basis of eight discrete thermocouples being analyzed as to their outputs, and the spread therebetween. These are shown in FIGURE 1A, and are designated T/C–1 through T/C–8 inclusive. It will be understood that apart from the illustrative embodiment, the invention pertains to any number of devices of any sort which provide electrical signals of varying magnitude depending upon existing conditions which may vary.

The Sampling Circuit

This circuit, shown in FIGURES 1A and 1B includes sequence relays K–1 through K–8 inclusive, each having an operating coil and two relay arms. Each relay is a a single throw-double pole device. The upper contact of each of the relays K–1 through K–8 is connected to one of the thermocouple leads. The other of the thermocouple leads are connected in common to ground. A thermocouple bus 10 interconnects the upper relay arms of K–1 through K–8 and proceeds into the high-low selector circuit in FIGURE 1D.

The lower relay arms of K–1 through K–8 are connected in common to B+, while the lower contacts of K–1 through K–8 are each connected to one of a set of conductors designated collectively by reference character 12, which conductors proceed into the memory circuit in FIGURE 1C. It will be further noted that a set of eight conductors designated collectively by reference character 14 are each connected to one of the upper contacts of K–1 through K–8 and therefore to the ungrounded side of one of the thermocouples and also proceed into the memory circuit.

The sampling circuit further includes double throw-double pole sequence relays K–9 through K–16 inclusive, which form a stepping chain for sequentially operating the aforesaid relays K–1 through K–8 and also includes a further initiating relay K–17. Each of relays K–9 through K–16 has associated with it an operating circuit including a transistor, the latter being designated Q–1 through Q–8 inclusive. The first stage or operating circuit includes transistor Q–1 and relay K–9. The collector of Q–1 is connected through the operating winding 16 of K–9 and a paralleling unidirectional conducting device CR–1 to B+. The base of Q–1 is connected between resistors R–1 and R–2 serving as a voltage divider between B+ and ground while the emitter is connected through the resistor R–3 to ground. The other stages of the sampling circuit, made up of transistors Q–2 through Q–8, are entirely similar.

The operation of the sequencing chain arises upon application of B+ to relay K–17. Such application of B+ causes a momentary surge of current through the winding of K–17 due to capacitance C–1 being connected in parallel with resistance R–4 to ground. Such energization of K–17 momentarily closes its contact to apply B+ through resistor R–5 and line 18 to the base of Q–1. This momentary shift in the potential of the base turns on Q–1, energizing the winding 16 to K–9, at which time the lower relay arm of K–9 applies B+ through its lower contact to a capacitance C–2 connected to ground. At the same moment, the upper relay arm of K–9 completes a circuit from ground through the operating coil of K–1 to B+, thus operating the relay arms of the latter to connect, through its upper relay arm, the lead from T/C–1 to bus 10 and to disconnect, via its lower relay arm, B+ from the associated conductor 12.

When K–9 returns to its unenergized position following the momentary operation of K–17, the lower relay arm of K–9 touches its upper contact and the charge on C–2 causes a pulse to be applied through R–6 to the base of Q–2. Thus relay K–10 operates after K–9 and K–2 operates after K–1. It will be now apparent that the respective relays K–1 through K–8 are sequentially operated. In this manner, the ungrounded thermocouple leads of T/C–1 through T/C–8 are sequentially connected to the bus 10, while the corresponding conductors 12 are sequentially disconnected from B+. Following the return of K–16, in the last stage, to its unoperated position, the charge on its associated capacitor C–3 will be applied through line 20 and resistor R-7 to the previously mentioned line 18 to recycle relays K-9 through K-16 (and therefore the relays K-1 through K-8). The charge of C-3 is simultaneously applied over lines 20 and 22 to the high-low selector circuit.

The Memory Circuit

This circuit, shown in FIGURE 1C is comprised of two stepping solenoid rotary switches, each having two rotary gangs with eight contacts in each gang. The first is the high memory switch S-1 having upper and lower gangs S-1A and S-1B respectively, and the second is the low memory switch S-2 having upper and lower gangs S-2A and S-2B respectively. The contacts of S-1A are each connected to a respective one of the thermocouples T/C-1 through T/C-8 through individual connections to the conductors designated collectively by reference character 14, and the wiper of S-1A is connected over line 24 into the high-low selector circuit. The contacts of S-1B are each connected to a respective one of the lower relay arms of K-1 through K-8 through individual connections to the conductors designated collectively by reference character 12, and the wiper of S-1B is connected through the operating winding of S-1 and over line 26 into the high-low selector circuit.

Rotary stepping, low memory switch S-2 is entirely similar to S-1. The upper gang S-2A has its contacts connected to the conductors 14 in parallel with the contacts of S-1A and the lower gang S-2B has its contacts connected to the conductors 12 in parallel with the contacts of gang S-1B. The wiper of S-2A is connected over line 28 into the high-low selector circuit while the wiper of S-2B is connected through the operating winding of S-2 and over line 30 into that same circuit.

The operating mechanism which steps S-1 and S-2 may be any suitable means which causes the wipers of either S-1 or S-2, depending on which of lines 26 and 30 is connected to ground (as will be described hereinbelow), to rotate one step at a time in the direction shown until reaching a contact on either gang S-1B or S-2B from which B+ has been disconnected by operation of one of relays K-1 through K-8.

The High-Low Selector Circuit

This circuit, shown in FIGURE 1D, is comprised of a bistable circuit made up of transistors Q-9 and Q-10. It will be noted there is a cross-connection between the bases and collectors of Q-9 and Q-10 through the resistors R-8 and R-9. The emitters of Q-9 and Q-10 are connected in common, and across R-10 to ground. The collectors of Q-9 and Q-10 are connected through the operating windings of two selecting relays K-18 and K-19 respectively, to B+ and these windings are each parallel by uni-directional conducting devices CR-2 and CR-3 respectively. The bases of Q-9 and Q-10 are connected respectively, through uni-directional conducting devices CR-4 and CR-5 in common to a line 32 which is coupled through a network C-4 and R-11 to the previously mentioned line 22 extending from the sampling circuit. R-12 provides the usual biasing resistance to ground from line 32.

In operation, each pulse arising on line 22 from C-3 at the end of each sequence will shift the bistable circuit of transistors Q-9 and Q-10 to its opposite state. In one of the states of the bistable circuit, the relay winding K-18 will be carrying sufficient current to operate its two relay arms to their lowermost positions whereby the wiper of S-2A will be connected via line 28 to a line 34 and the thermocouple bus 10 will be connected to a line 36. Simultaneously, K-19 is not carrying sufficient current to operate and its relay arm connects a line 38 to the previously mentioned line 30 connected to the operating winding of S-2. In the other state of the bistable circuit, K-18 is not operated whereby line 34 will be connected to thermocouple bus 10 and line 36 will be connected to the wiper of S-1A, while K-19 is operated whereby the line 38 will be connected to the previously mentioned line 26 which is connected to the operating winding of S-1.

It should be noted that the momentary closing of K-17, in the sampling circuit also places a pulse on line 22 through R-7 to initially set the bistable circuit to one or the other of its states. Under normal operation this pulse can set the state such that relay K-18 is not operated but K-19 is operated or it can set the state such that relay K-18 is operated but K-19 is not operated. In other words, the sequencing of T/C-1 through T/C-8 may begin on either the high temperature sampling cycle or the low temperature sampling cycle.

The lines 34 and 36 are interconnected by a capacitance C-5 and also by the series connected capacitances C-6 and C-7, the midpoint connection of which is grounded. Lines 34 and 36 terminate respectively, at contacts 34a and 36a between which operates the relay arm of a chopping relay K-21 which is driven at some convenient frequency such as sixty or 400 cycles per second current generated in transformer T-1, having a first center-tap grounded secondary 40, which is connected with the operating winding of K-21, and a second secondary 42, to be described later. The primary 44 of T-1 may be connected to any convenient source of alternating current power via the conductors 46. Relay 21 is a polarized relay, that is, it follows the positive and negative half-cycle of the T-1 power source. For example, the arrangement might be such that on the positive half-cycle, the relay arm of K-21 would rest on contact 34a, but would rest on contact 36a on the negative half-cycle.

As will become more fully apparent hereinafter, the lines 34 and 36 will generally carry the outputs of two different thermocouples between which comparison is desired. To the extent that there is a difference in output of the said thermocouples, lines 34 and 36 will be at differing potentials, which will appear at contacts 34a and 36a.

The Amplifier Circuit

The operating arm of polarized relay K-21 provides the input to any suitable alternating current amplifier, one comprising transistor stages Q-11 through Q-18 being illustrated in detail, and the output of the amplifier appears across the operating winding of a stepping relay K-20 located in the output circuit of the final stage Q-18. A zener regulating diode 47 is connected in the collector circuit of Q-18. Upon operation of K-20, a circuit is completed to ground from B+ through the wiper of S-1B (or S-2B), line 26 (or line 30, dependent on the condition of K-19), line 38 and the relay arm of K-20.

The coil of S-1 (or S-2, depending on K-19), causes its respective wipers to step around until the lower wiper B rests on the contact in its gang from which B+ has been momentarily removed by the operation of one of K-1 through K-8 corresponding to that thermocouple which creates the differential signal on the relay arm of K-21. In other words, operation of K-20 causes S-1 and S-2 to seek and hold the thermocouple reading, high and low, respectively, which developed the greatest differential signal in each sequence operation of the sampling circuit.

Because of the function of the apparatus to find out and hold on the highest or lowest temperature, depending upon the particular sequence being performed and since the amplifier is driven by a differential signal input, the amplifier circuit must be phased to the polarity of the input so as to only operate the stepping relay K-20 when the differential signal is of proper polarity and has a predetermined magnitude. The means by which the amplifier is preset to respond only to signals above a selected value are conventional and will therefore not be discussed.

The means to develop proper phasing to assure operation of K-20 only on a given polarity of input are as follows: It is first noted that, due to the arrangement of the sampling, memory and high-low selector circuits, the potential on contact 34a is equal to or higher than that on contact 36a until S-1 or S-2 are stepped to the position of the highest or lowest thermocouple reading, depending on the sequence in use. At that time, the differential on contacts 34a and 36a becomes zero. Thereafter, on subsequent steps of the sequence, contact 34a is lower in potential than contact 36a. In other words, operation of K-20 is desired only when contact 34a is at higher potential than contact 36a so that S-1 and S-2 will seek and hold on the highest and lowest temperature readings, respectively.

To this end, the transformer T-1 has its second centertap grounded secondary 42 connected via unidirectional devices CR-6 and CR-7 to amplifier stages Q-16 and Q-17 respectively, whic hare arranged in push-pull fashion to drive the final stage Q-18. Stages Q-16 and Q-17 receive the output of stage Q-15 via the center-tap grounded secondary of a transformer T-2. Transformers T-1, T-2 and relay K-21 are poled such that when contact 34a is at a higher potential than 36a, the resultant polarity of differential signal fed into the first stage Q-11 appears in the secondary of T-2 in phase to the A.C. source signal in the secondary 42 of T-1. Thus, stages Q-16 and Q-17 are turned on during their proper half-cycle when the respective stage receives a signal from that secondary 42, and Q-18 functions to energize the stepping relay K-20.

The amplifier circuit is also controlled, again by conventional techniques, so that no output occurs on receipt of an input of zero differential.

On subsequent steps of the sequence, after S-1 (or S-2) steps to the high (or low) position, contact 34a carries a lower potential than does contact 36a thereby reversing the polarity of the differential signal. This reversed signal appears in the secondary of T-2 out of phase to the A.C. source signal in the secondary 42 of T-1. Therefore, neither of Q-16 or Q-17 is turned on during its proper half cycle when the respective stage receives a signal from the secondary 42. Q-18 does not then function to operate K-20. Relay K-20 and its associated circuitry are selected such that the releasing action of K-20 is slow enough to allow a complete stepping cycle, if necessary, during one period in the sequencing of relays K-1 through K-8. This feature insures that the high (or low) value will be found and held for reference use before the next relay of the chain K-1 through K-8 operates.

It should be apparent now how the apparatus functions to seek and hold on the highest value during one sequence, and on the lowest value during the subsequent sequence.

*The Indicator Circuit*

The indicator circuit is primarily to provide the user with a reading as to the differential or spread between the respective outputs of the thermocouples producing the greatest and least signals. This is accomplished by having one line 48 connected to the wiper of S-2A and a second line 50 connected to the wiper of S-1A. These lines, while the wipers of S-1A and S-2A remain on given contacts thereof, are carrying direct current, and a suitable meter M, connected between lines 48 and 50 with whatever resistance (not shown) being required being in series with the meter, will indicate the differential, if such exists, between the D.C. values on lines 48 and 50. The indicator circuit may also include any suitable means 52 for detecting any given measurement of a differential signal above a predetermined value, to illuminate a lamp or otherwise provide a positive "good/no-good" indication.

*Operation*

For an analysis of operation, let it be assumed that B+ has been applied to K-17, and the relays K-1 through K-8 are being sequentially and cyclically operated as aforesaid. Let it furthermore be understood that K-18 and K-19 are operated or not, as previously described, for each sequence of operation of K-1 through K-8.

Let it further be assumed that at the moment this operational analysis begins, the wipers of S-1 and S-2 are in their positions shown, to wit, pointing upward so that the output of T/C-1 is applied over the proper conductor 14 to the wipers of S-1A and S-2A and the conductor 12 connected to the lower contact of K-1 is applying B+ to the wipers of S-1B and S-2B.

Let it further be assumed that power is applied to transformer T-1 and chopper relay K-21 is operating.

Let it further be assumed that the thermocouples are in steady state operation, and T/C-1, T/C-2, T/C-4, T/C-5, T/C-7 and T/C-8 are at a uniform output values, say representing 700° C. However, let it be supposed that T/C-3 is at an irregular high temperature of 730° C., while T/C-6 is low at 670° C.

The beginning of this analysis will be at the moment when K-1 is operated, in a cycle when K-18 is not operated and K-19 is operated, that is, when the high-low selector circuit is set to find the highest thermocouple output, and line 38 is connected via line 26 to the wiper of S-1B. During this momentary period of operation of K-1, via its upper relay arm, the output of T/C-1 will be applied through the thermocouple bus 10 and the lower relay arm of K-18 to the line 34 and the contact 34a. At this moment the contact 36a carries the output of this same thermocouple T/C-1, which is obtained directly through the wiper of S-1A and line 24. Naturally, there is no differential voltage across contacts 34a, 36a and the output of the amplifier at Q-18 is zero, and no operation of relay K-20 occurs.

Still referring to the same momentary period of operation of K-1, B+ will be momentarily removed by the lower relay arm of K-1, from the corresponding contact of gang S-1B. However, this will have no effect since the wiper arm of S-1B is already resting on this contact and since relay K-20 is not operated.

Proceeding to the momentary period when K-2 is operated in the cycle under analysis, thermocouple bus 10 will now deliver the output of T/C-2 to the contact 34a of the chopper relay. However, the contact 36a still carries the output of T/C-1. Because of the assumed condition of T/C-2 as experiencing the same temperature as T/C-1, there will still be no operation of the relay K-20, inasmuch as the amplifier circuit has no differential input.

Continuing to the momentary period of operation of K-3, the thermocouple bus 10 now delivers to contact 34a a signal having a potential somewhat higher than that appearing at contact 36a due to the assumed operation of T/C-3 at 730° C., above the 700° C. of T/C-1. Now the amplifier does have an input of proper polarity due to the difference in voltage of contacts 34a and 36a, representing T/C-3 and T/C-1, respectively. The consequent output of the amplifier at Q-18 will operate relay K-20 and line 38 will be grounded. Accordingly, line 26 will be grounded via the lower contact of relay K-19. Since K-1 is no longer in its operated position, B+ will be applied via its lower contact and the corresponding conductor 12 through the wiper of S-1B and through the operating coil of S-1. S-1 will therefore step once to its second position and since K-2 is not operated, the wiper of S-1B will again complete a circuit from B+ to ground through the coil of S-1, and S-1 will step once again so that the wiper of S-1B comes to rest upon the contact connected to the conductor 12 which leads to the contact cooperating with the lower relay arm of K-3. Since K-3 is operated, B+ has been removed from the just mentioned conductor, and this causes the stepping operation of S-1 to stop. Accordingly, the wipers of S-1A and S-1B remain upon the contacts thereof shown at the "three o'clock" position.

Proceeding to the momentary operating period of K-4 the amplifier will receive a differential input of magnitude the same as the one for the momentary operation of K-3 but of opposite polarity since the output of T/C-4 on contact 34a is now lower in potential than the new reference output of T/C–3 on contact 36a. However, K–20 will not operate, because as previously described, the amplifier circuit precludes operation with this reversed polarity input. Therefore, the wipers of S–1A and S–1B remain connected to the output of the high reading thermocouple T/C–3.

Nothing different occurs during the momentary operation of K–5.

During the period of momentary operation of K–6 still nothing occurs because the output of T/C–6 at 670° C. on contact 34a is even further below the new reference potential of T/C–3 being applied via the wiper of S–1A to contact 36a As aforesaid, the amplifier circuit precludes operation of K–20 for this condition.

The period of operation of K–7 and that of K–8 will not change the situation, because the outputs of T/C–7 and T/C–8 are less than that of T/C–3.

The operation of K–16, which caused K–8 to operate, has at this time caused an output pulse from C–3 to appear upon the line 22 which pulse shifts the state of the bistable high-low selector circuit energizing K–18 and deenergizing K–19. In its new condition, line 36 will now connect with the thermocouple bus 10 while the line 34 will connect with the wiper of S–2A. The apparatus is now set to seek out and hold the lowest reading of the thermocouples.

By following the analysis as above developed for seeking the highest reading thermocouple, the periods of operation of K–1 and K–2 will have no effect as there is a zero differential. Nor will the period of operation of K–3 have an effect, because here the thermocouple bus 10 is supplying a high value potential to contact 36a while the contact 34a is receiving a lower potential via the wiper of S–2A from the thermocouple T/C–1, thereby producing the wrong polarity of amplifier input. The operation proceeds through the periods of operation of K–4 and K–5 without alteration.

However, during the momentary period of operation of K–6, the thermocouple bus delivers the assumed low reading of T/C–6 at 670° via the thermocouple bus 10 to contact 36a. The output 34a now carries the relatively high potential of T/C–1 derived through the wiper of S–2A. This circumstance produces the proper amplifier input polarity and operates relay K–20 to ground the line 38, which is now connected via the upper contact of K–19 to the line 30 which connects to the operating winding of S–2. Accordingly, S–2 will now step around in the same manner as S–1 did, until its wiper rests upon the contact which is connected to the lower contact of K–6, where the stepping action will be stopped due to the fact that the just mentioned contact is removed from the source of B+, which S–2 requires to continue the stepping operation. The momentary periods of operation of K–7 and K–8 will not have any further effect upon S–2.

To summarize at this point, it will now be apparent that S–1A is holding on T/C–3, the high reading thermocouple, while S–2A is holding on T/C–6, the lower reading thermocouple. As the sequential cycle of operation of K–1 through K–8 continues, for alternate cycles thereof, the high-low selector circuit will shift and the overall circuit will therefore continue to seek out and hold upon the high and low reading thermocouples. If the assumed condition continues, T/C–3 reading high and T/C–6 reading low and the other thermocouples reading at some intermediate value, S–1 and S–2 will not move. During the existence of this condition the meter M in the indicator circuit will show the total differential between the readings of T/C–3 and T/C–6. If this is more than a predetermined maximum, the indicator 52 will be operated.

If during continued operation for any reason the output of T/C–3 should diminish while that of some other thermocouple increases above T/C–3, or if T/C–3 remains the same but say T/C–4 goes up to a value exceeding T/C–3, it is believed now apparent that the high reference selector S–1 will step to the contact representing T/C–4. Similarly, if another thermocouple becomes the low reference, S–2 will step to its contacts indicating same.

It may be mentioned at this point that a visual or electrical indicator or detection means can be associated with S–1 and S–2 so that the user may not only be provided with information as to the differential or spread of between the highest and lowest thermocouples, but can be informed as to which thermocouples are in these respective conditions.

It will now be understood that the present invention provides means for determining the total deviation, maximum to minimum, of output readings of a plurality of devices subject to fluctuation, without dependence upon the outputs having reference to any given value. In other words, the total maximum deviation or spread is ascertained entirely relative to the respective readings, whatever said range of readings may be with regard to any absolute values.

Thus, it is apparent that this invention successfully achieves the several objects and advantages herein set forth.

Other modifications not described herein will become apparent to those having ordinary skill in the art after reading this disclosure. Therefore, no limitation is intended, by the foregoing description and the accompanying drawings, to the scope of the invention being defined in the appended claims.

What is claimed is:

1. A differential detection system comprising a plurality of input means each carrying a signal subject to variation, means for sampling the signals on said signal carrying input means to concurrently detect both the one carrying the relatively highest value signal and the one carrying the relatively lowest value signal irrespective of the absolute values of any of the signals, the system including comparison for comparing the signal on a given one of the signal carrying input means with the signals on each of the other signal carrying input means and producing an output signal upon detection of a differential of given polarity between input signals.

2. A system as in claim 1 including means responsive to said output signal for causing alternate sampling and comparison cycles to be with reference to the one of the input means carrying said highest value signal.

3. A system as in claim 1 including means responsive to said output signal for causing alternate sampling and comparison cycles to be with reference to the one of the input means carrying said lowest value signal.

4. A system as in claim 1 which includes comparison means for sequentially comparing the signal on a given one of the signal carrying input means with the signals on each of the other signal carrying input means and producing an output signal upon detection of a differential of given polarity between input signals.

5. A differential detection system comprising a plurality of means each carrying a signal subject to variation in value, means for cyclically sampling said signal carrying means, means for concurrently selectively sampling both the signal carrying means carrying the relatively highest value signal and the relatively lowest value signal, comparison means having first and second inputs and an output, the first comparison input being sequentially connected via said cyclic sampling means to said signal carrying means, the second comparison input being connected to one of said signal carrying means via said selective sampling means, and means responsive to an output from said comparison means for operating said selective sampling means to connect said second comparison input to another of said signal carrying means.

6. A system as in claim 5 wherein the comparison means includes means for rendering the selective sampling means operative for connecting same to another signal carrying means only when the value of the signals on the two comparison inputs have a predetermined polarity relationship.

7. A differential detection system comprising a plurality of means each for carrying a signal subject to variation in value first means and second means each for cyclically sampling said signal carrying means, first means and second means for selectively sampling said signal carrying means, comparison means having two inputs and an output, means for periodically connecting the first comparison input to the respective cyclic sampling means and the second comparison input to the respective selective sampling means, and means responsive to an output of said comparison means for operating the selective sampling means to which the second comparison input is then connected to connect said second comparison input to another of said signal carrying means.

8. A system as in claim 7 wherein the periodically connecting means operates once for every sampling cycle of said respective cyclic sampling means.

9. A system as in claim 7 and including means for causing one of said selective sampling means to home to and hold on the signal carrying means carrying the highest value signal and the other selective sampling means to home to and hold on the signal carrying means carrying the lowest value signal.

10. Apparatus as in claim 9 wherein each signal carrying means is connected to a thermocouple which provides the source of a signal upon the carrying means.

References Cited in the file of this patent

UNITED STATES PATENTS

| | | |
|---|---|---|
| 1,263,308 | Bristol | Apr. 16, 1918 |
| 2,688,740 | Merrill et al. | Sept. 7, 1954 |
| 2,815,500 | Hance et al. | Dec. 3, 1957 |

UNITED STATES PATENT OFFICE
CERTIFICATE OF CORRECTION

Patent No. 3,138,957　　　　　　　　　　　　　　June 30, 1964

Raymond D. Brunson

It is hereby certified that error appears in the above numbered patent requiring correction and that the said Letters Patent should read as corrected below.

Column 8, line 38, after "comparison" insert -- means --.

Signed and sealed this 10th day of November 1964.

(SEAL)
Attest:

ERNEST W. SWIDER　　　　　　　　　　　　　　　EDWARD J. BRENNER
Attesting Officer　　　　　　　　　　　　　　　Commissioner of Patents